United States Patent
Christensen et al.

(10) Patent No.: US 9,761,878 B2
(45) Date of Patent: *Sep. 12, 2017

(54) METAL/OXYGEN BATTERY WITH A CLEAN SURFACE FOR OXIDIZING REDOX ADDITIVES

(71) Applicant: Robert Bosch GmbH, Stuttgart (DE)

(72) Inventors: John F. Christensen, Mountain View, CA (US); Paul Albertus, Washington, DC (US); Timm Lohmann, Mountain View, CA (US); Boris Kozinsky, Waban, MA (US); Aleksandar Kojic, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 591 days.

This patent is subject to a terminal disclaimer.

(21) Appl. No.: 14/310,765

(22) Filed: Jun. 20, 2014

(65) Prior Publication Data

US 2015/0295245 A1  Oct. 15, 2015

Related U.S. Application Data (63) Continuation-in-part of application No. 12/888,637, filed on Sep. 23, 2010.
(Continued)

(51) Int. Cl.
*H01M 4/38* (2006.01)
*H01M 4/62* (2006.01)
(Continued)

(52) U.S. Cl.
CPC ............ *H01M 4/62* (2013.01); *H01M 4/382* (2013.01); *H01M 8/188* (2013.01); *H01M 12/08* (2013.01); *H01M 4/624* (2013.01); *Y02E 60/128* (2013.01)

(58) Field of Classification Search
None
See application file for complete search history.

(56) References Cited

U.S. PATENT DOCUMENTS

| 4,857,423 A | 8/1989 | Abraham et al. |
| 5,858,573 A | 1/1999 | Abraham et al. |

(Continued)

FOREIGN PATENT DOCUMENTS

| EP | 0319182 | 6/1989 |
| WO | 03063272 A1 | 7/2003 |

(Continued)

OTHER PUBLICATIONS

Christensen, J. and J. Newman, Effect of anode film resistance on the charge/discharge capacity of a lithium-ion battery. Journal of the Electrochemical Society, 2003. 150(11): p. A1416-A1420.
(Continued)

*Primary Examiner* — Maria J Laios
(74) *Attorney, Agent, or Firm* — Maginot Moore & Beck LLP (57) ABSTRACT

In one embodiment, an electrochemical cell includes a negative electrode including a form of lithium, a positive electrode spaced apart from the negative electrode and including an electron conducting matrix, a current collector, and a conductor, the conductor having a potential controllable with respect to the collector potential, a separator positioned between the negative electrode and the positive electrode, an electrolyte including a salt, and a charging redox couple located within the positive electrode, wherein the electrochemical cell is characterized by the transfer of electrons from a discharge product located in the positive electrode to the electron conducting matrix by the charging redox couple during a charge cycle.

20 Claims, 5 Drawing Sheets

Related U.S. Application Data (60) Provisional application No. 61/837,691, filed on Jun. 21, 2013.

(51) Int. Cl.
  *H01M 8/18* (2006.01)
  *H01M 12/08* (2006.01)

(56) References Cited

U.S. PATENT DOCUMENTS

| | | | |
|---|---|---|---|
| 6,387,571 | B1 | 5/2002 | Lain et al. |
| 7,160,648 | B2 | 1/2007 | Noh |
| 7,615,317 | B2 | 11/2009 | Dahn et al. |
| 2006/0199080 | A1 | 9/2006 | Amine et al. |
| 2007/0178370 | A1 | 8/2007 | Amine et al. |
| 2009/0104510 | A1* | 4/2009 | Fulop .............. H01M 2/30 429/50 |
| 2009/0239113 | A1 | 9/2009 | Hase et al. |
| 2010/0081059 | A1 | 4/2010 | Exnar et al. |
| 2010/0129724 | A1 | 5/2010 | Kolosnitsyn |
| 2012/0077084 | A1 | 3/2012 | Christensen et al. |
| 2012/0094193 | A1 | 4/2012 | Albertus et al. |
| 2012/0315554 | A1 | 12/2012 | Christensen et al. |

FOREIGN PATENT DOCUMENTS

| | | |
|---|---|---|
| WO | 2010014332 | 2/2010 |
| WO | 2011133982 A1 | 10/2011 |
| WO | 2013077863 A1 | 5/2013 |
| WO | 2013077870 A1 | 5/2013 |

OTHER PUBLICATIONS

Christensen, J. and J. Newman, Cyclable Lithium and Capacity Loss in Li-Ion Cells. Journal of the Electrochemical Society, 2005. 152(4): p. A818-A829.

Amatucci, G.G. and N. Pereira, Fluoride based electrode materials for advanced energy storage devices. Journal of Fluorine Chemistry, 2007. 128(4): p. 243-262.

USABC Goals for Advanced Batteries for EVs. 2002, United States Advanced Battery Consortium.

Ogasawara, T., A. Debart, M. Holzapfel, P. Novak, and P.G. Bruce, Rechargeable Li2O2 Electrode for Lithium Batteries. Journal of the American Chemical Society, 2006. 128(4): p. 1390-1393.

Abraham, K.M. and Z. Jiang, A polymer electrolyte-based rechargeable lithium/oxygen battery. Journal of the Electrochemical Society, 1996. 143(1): p. 1-5.

Zheng, J., R. Liang, M. Hendrickson, and E. Plichta, Theoretical Energy Density of Li-Air Batteries. Journal of the Electrochemical Society, 2008. 155: p. A432.

Beattie, S., D. Manolescu, and S. Blair, High-Capacity Lithium-Air Cathodes. Journal of the Electrochemical Society, 2009. 156: p. A44.

Kumar, B., J. Kumar, R. Leese, J. Fellner, S. Rodrigues, and K. Abraham, A Solid-State, Rechargeable, Long Cycle Life Lithium-Air Battery. Journal of the Electrochemical Society, 2010. 157: p. A50.

Read, J., Characterization of the lithium/oxygen organic electrolyte battery. Journal of the Electrochemical Society, 2002. 149: p. A1190.

Read, J., K. Mutolo, M. Ervin, W. Behl, J. Wolfenstine, A. Driedger, and D. Foster, Oxygen transport properties of organic electrolytes and performance of lithium/oxygen battery. Journal of the Electrochemical Society, 2003. 150: p. A1351.

Yang, X. and Y. Xia, The effect of oxygen pressures on the electrochemical profile of lithium/oxygen battery. Journal of Solid State Electrochemistry: p. 1-6.

Richardson, T.J. and P.N. Ross Jr., Overcharge protection for rechargeable lithium polymer electrolyte batteries. Journal of the Electrochemical Society, 1996. 143: p. 3992.

Abraham, K.M., D.M. Pasquariello, and E.B. Willstaedt, n-Butylferrocene for Overcharge Protection of Secondary Lithium Batteries. Journal of the Electrochemical Society, 1990. 137(6): p. 1856-1857.

Golovin, M.N., D.P. Wilkinson, J.T.Dudley, D. Holonko, and S. Woo, Applications of metallocenes in rechargeable lithium batteries for overcharge protection. Journal of the Electrochemical Society, 1992. 139: p. 5.

International Search Report and Written Opinion in corresponding PCT Application (i.e., PCT/US2011/061891), mailed Aug. 3, 2012 (11 pages).

Kumar et al., "A Solid-State, Rechargeable, Long Cycle Life Lithium-Air Battery," Journal of the Electrochemical Society, Nov. 13, 2009, pp. A50-A54, vol. 157, Issue 1, The Electrochemical Society, Needham, MA USA (5 pages).

NASA, "Scientific and Technical Aerospace Reports—STAR, Scientific and Technical Information Program Office," May 29, 2007, pp. 1-125, vol. 45, No. 10, Langley Research Center, USA (125 pages).

O'Laoire, "Dissertation—Investigations of oxygen reduction reactions in non-aqueous electrolytes and the lithium-air battery," Department of Chemistry and Chemical Biology Chemistry Dissertations, 2010, pp. 0-173, Northeastern University, Boston Massachusetts (173 pages).

International Search Report and Written Opinion corresponding to PCT Application No. PCT/US2014/043446, mailed Oct. 24, 2014 (13 pages).

* cited by examiner

METAL/OXYGEN BATTERY WITH A CLEAN SURFACE FOR OXIDIZING REDOX ADDITIVES

This application is a continuation in part of co-pending U.S. application Ser. No. 12/888,637 filed Sep. 23, 2010, and claims the benefit of U.S. Provisional Application No. 61/837,691 filed Jun. 21, 2013, the entirety of which are both incorporated herein by reference.

TECHNICAL FIELD

This invention relates to batteries and more particularly to metal/air based batteries.

BACKGROUND

Rechargeable lithium-ion batteries are attractive energy storage systems for portable electronics and electric and hybrid-electric vehicles because of their high specific energy compared to other electrochemical energy storage devices. A typical Li- ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during a charging event, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

Batteries with a lithium metal negative electrode afford exceptionally high specific energy (in Wh/kg) and energy density (in Wh/L) compared to batteries with conventional carbonaceous negative electrodes. Other metals, such as Zn, Mg, Na, Fe, Al, Ca, Si, and others, also have a favorable specific energy and energy density.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity for which some practical cycling has been achieved for a lithium-ion positive electrode is 1168 mAh/g (based on the mass of the lithiated material), which is shared by $Li_2S$ and $Li_2O_2$. Other high-capacity materials include $BiF_3$ (303 mAh/g, lithiated), $FeF_3$ (712 mAh/g, lithiated), $LiOH.H_2O$ (639 mAh/g), and others. Unfortunately, all of these materials react with lithium at a lower voltage compared to conventional oxide positive electrodes, hence limiting the theoretical specific energy; however, the theoretical specific energies are still very high (>800 Wh/kg, compared to a maximum of ~500 Wh/kg for a cell with lithium negative and conventional oxide positive electrodes).

Figure 1:
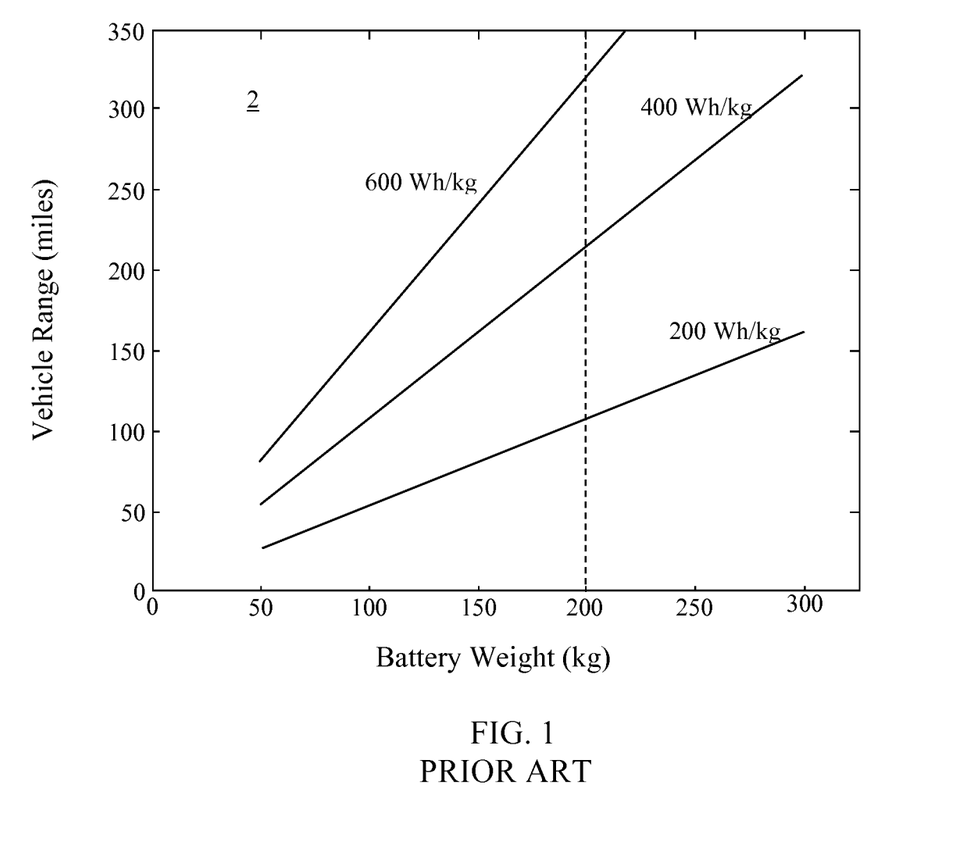
FIG. 1 depicts a plot showing the relationship between battery weight and vehicular range for various specific energies.

FIG. 1 depicts a chart 2 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Figure 2:
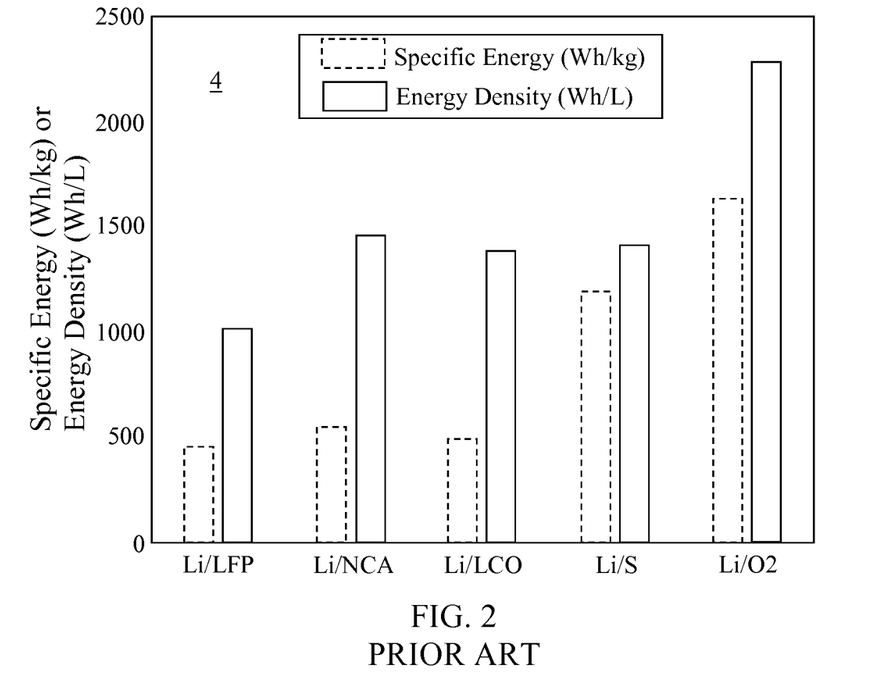
FIG. 2 depicts a chart of the specific energy and energy density of various lithium-based cells.

Various lithium-based chemistries have been investigated for use in various applications including in vehicles. FIG. 2 depicts a chart 4 which identifies the specific energy and energy density of various lithium-based chemistries. In the chart 4, only the weight of the active materials, current collectors, binders, separator, and other inert material of the battery cells are included. The packaging weight, such as tabs, the cell can, etc., are not included. FIG. 2 shows the significant advantage offered, at least theoretically, by the lithium-oxygen system, compared with the lithium-ion cells with a conventional positive-electrode materials such as $Li_yCoO_2$ or $Li_yNi_{0.80}Co_{0.15}Al_{0.05}$ $O_2$. The use of other metals can also offer a higher specific energy than Li-ion cells with conventional positive electrodes. As is evident from the chart 4, lithium/air batteries, even allowing for packaging weight, are capable of providing a specific energy >600 Wh/kg and thus have the potential to enable driving ranges of electric vehicles of more than 300 miles without recharging, at a similar cost to typical lithium ion batteries.

Figures 3, 4, 5:
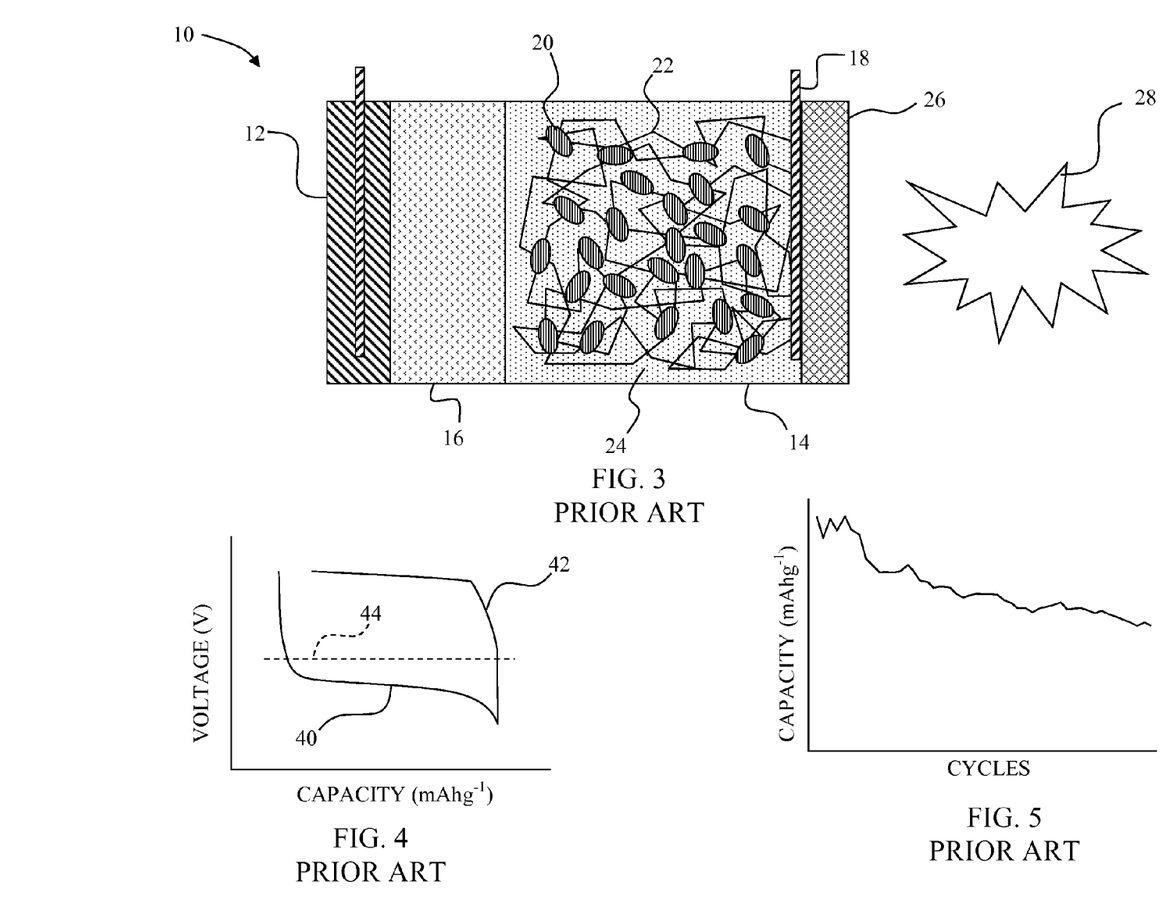
FIG. 3 depicts a schematic view of a prior art lithium-ion cell including two electrodes and an electrolyte.
FIG. 4 depicts a discharge and charge curve for a typical Li/air electrochemical cell.
FIG. 5 depicts a plot showing decay of the discharge capacity for a typical Li/air electrochemical cell over a number of cycles.

An electrochemical cell 10 is depicted in FIG. 3. The cell 10 includes a negative electrode 12, a positive electrode 14, a porous separator 16, and a current collector 18. The negative electrode 12 is typically metallic lithium. The positive electrode 14 includes carbon particles such as particles 20 possibly coated in a catalyst material (such as Au or Pt) and suspended in a porous, electrically conductive matrix 22. An electrolyte solution 24 containing a salt such at $LiPF_6$ dissolved in an organic solvent such as dimethyl ether or $CH_3CN$ permeates both the porous separator 16 and the positive electrode 14. The $LiPF_6$ provides the electrolyte with an adequate conductivity which reduces the internal electrical resistance of the cell 10 to allow a high power.

The positive electrode 12 is enclosed by a barrier 26. The barrier 26 in FIG. 3 is formed from an aluminum mesh configured to allow oxygen from an external source 28 to enter the positive electrode 14. The wetting properties of the positive electrode 14 prevent the electrolyte 24 from leaking out of the positive electrode 14. Oxygen from the external source 28 enters the positive electrode 14 through the barrier 26 while the cell 10 discharges, and oxygen exits the positive electrode 14 through the barrier 26 as the cell 10 is charged.

As an example of the reactions and technological requirements in a Metal/oxygen cell, during discharge of the lithium/oxygen cell, Li metal dissolved from the negative electrode, while at the positive electrode, Li+ ions in the electrolyte react with oxygen and electrons to form a solid $Li_2O_2$ (or $Li_2O$) product, which may coat the conductive matrix of the positive electrode and/or fill the pores of the electrode. The solid product is thought to be electronically insulating, at least in its crystalline, bulk form. During charge of the cell, the $Li_2O_2$ (or $Li_2O$) is oxidized to form $O_2$, Li+ in the electrolyte, and electrons at the positive electrode, while at the negative electrode, Li+ in the electrolyte is reduced to form Li metal.

While lithium/air cells have been demonstrated in controlled laboratory environments, a number of issues remain before full commercial introduction of a lithium/air cell is viable. A number of investigations into the problems associated with Li-air batteries have been conducted as reported, for example, by Beattie, S., D. Manolescu, and S. Blair, "High-Capacity Lithium-Air Cathodes," *Journal of the Electrochemical Society*, 2009. 156: p. A44, Kumar, B., et al., "A Solid-State, Rechargeable, Long Cycle Life Lithium-Air Battery," *Journal of the Electrochemical Society*, 2010. 157: p. A50, Read, J., "Characterization of the lithium/oxygen organic electrolyte battery," *Journal of the Electrochemical Society*, 2002. 149: p. A1190, Read, J., et al., "Oxygen transport properties of organic electrolytes and performance of lithium/oxygen battery," *Journal of the Electrochemical Society*, 2003. 150: p. A1351, Yang, X. and Y. Xia, "The effect of oxygen pressures on the electrochemical profile of lithium/oxygen battery," *Journal of Solid State Electrochemistry*: p. 1-6, and Ogasawara, T., et al., "Rechargeable $Li_2O_2$ Electrode for Lithium Batteries," *Journal of the American Chemical Society*, 2006. 128(4): p. 1390-1393.

Nonetheless, several challenges remain to be addressed for lithium-air batteries. These challenges include limiting dendrite formation at the lithium metal surface, protecting the lithium metal (and possibly other materials) from moisture and other potentially harmful components of air, designing a system that achieves acceptable specific energy and specific power levels, reducing the hysteresis between the charge and discharge voltages (which limits the round-trip energy efficiency), and improving the number of cycles over which the system can be cycled reversibly.

The limit of round trip efficiency occurs due to an apparent voltage hysteresis as depicted in FIG. 4. In FIG. 4, the discharge voltage 40 (approximately 2.5 to 3 V vs. $Li/Li^{+}$ is much lower than the charge voltage 42 (approximately 4 to 4.5 V vs. Li/Li+). The equilibrium voltage 44 (or open-circuit potential) of the lithium/air system is approximately 3 V. Hence, the voltage hysteresis is not only large, but also very asymmetric.

The large over-potential during charge may be due to a number of causes. For example, reaction between the $Li_2O_2$ and the conducting matrix 22 may form an insulating film between the two materials. Additionally, there may be poor contact between the solid discharge products $Li_2O_2$ or $Li_2O$ and the electronically conducting matrix 22 of the positive electrode 14. Poor contact may result from oxidation of the discharge product directly adjacent to the conducting matrix 22 during charge, leaving a gap between the solid discharge product and the matrix 22.

Another mechanism resulting in poor contact between the solid discharge product and the matrix 22 is complete disconnection of the solid discharge product from the conducting matrix 22. Complete disconnection of the solid discharge product from the conducting matrix 22 may result from fracturing, flaking, or movement of solid discharge product particles due to mechanical stresses that are generated during charge/discharge of the cell. Complete disconnection may contribute to the capacity decay observed for most lithium/air cells. By way of example, FIG. 5 depicts the discharge capacity of a typical Li/air cell over a period of charge/discharge cycles.

What is needed is a cell which decreases the charging voltage of the battery, while still allowing for high rates of discharge (i.e., high power). A further need exists for a battery with increased efficiency. A battery with decreased charging time requirements would also be beneficial.

SUMMARY

In one embodiment, an electrochemical cell includes a negative electrode including a form of lithium, a positive electrode spaced apart from the negative electrode and including an electron conducting matrix, a current collector, and a conductor, the conductor having a potential controllable with respect to the collector potential, a separator positioned between the negative electrode and the positive electrode, an electrolyte including a salt, and a charging redox couple located within the positive electrode, wherein the electrochemical cell is characterized by the transfer of electrons from a discharge product located in the positive electrode to the electron conducting matrix by the charging redox couple during a charge cycle.

In another embodiment, an electrochemical cell includes a negative electrode, a positive electrode spaced apart from the negative electrode and including a current collector and a conductor, the conductor having a potential controllable with respect to a potential of the collector, a separator positioned between the negative electrode and the positive electrode, an electrolyte including a salt, and a charging redox couple located within the positive electrode, wherein the electrochemical cell is characterized by the transfer of electrons from an electrically insulating discharge product located in the positive electrode to the electron conducting matrix by the charging redox couple during a charge cycle.

DETAILED DESCRIPTION

Figure 6:
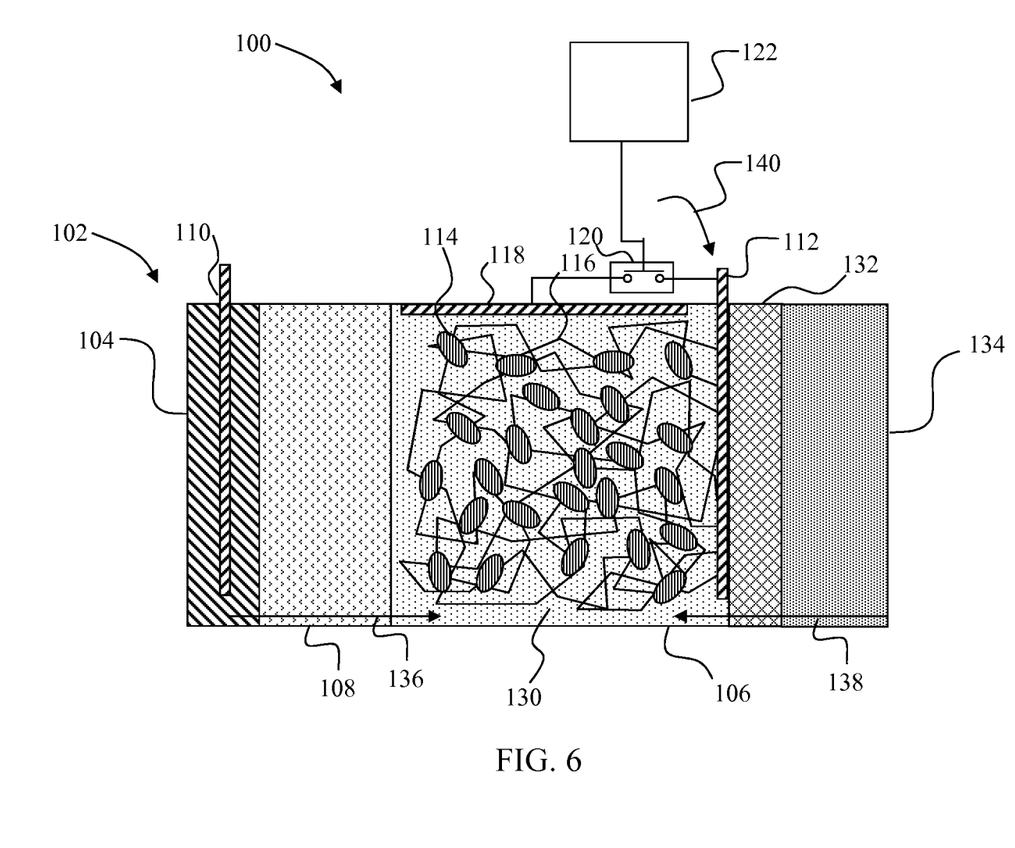
FIG. 6 depicts a schematic view of a lithium-air (Li/air) cell with two electrodes and a reservoir configured to exchange oxygen with a positive electrode for a reversible reaction with lithium which includes a concentration of charging redox couples which function as electron shuttles during charging of the Li/air cell, and a switch, which controllably electronically connects a conductor the current collector of the positive electrode, in an open position.

A schematic of an battery system 100 is shown in FIG. 6. The battery system 100 includes an electrochemical cell 102 with a negative electrode 104 separated from a positive electrode 106 by a porous separator 108 which may be, for example, a porous polymer separator filled with Li-ion conducting electrolyte. The negative electrode 104 is comprised of a metal (e.g., Li), intercalation electrode (e.g., Li-intercalated-graphite), alloy electrode (e.g., $Li_xSi$), conversion electrode (e.g., $Li_xFeF_3$), or other material that reacts reversibly with the working cation of the electrolyte (e.g., Li+) at a potential below that of the positive electrode 104 (i.e., where the discharge product, such as $Li_2O_2$, is formed on discharge and decomposed on charge). The negative electrode 104, which may also contain binder, conductive additives, and electrolyte-filled pores, is in contact with an electrical current collector 110.

Figure 7:
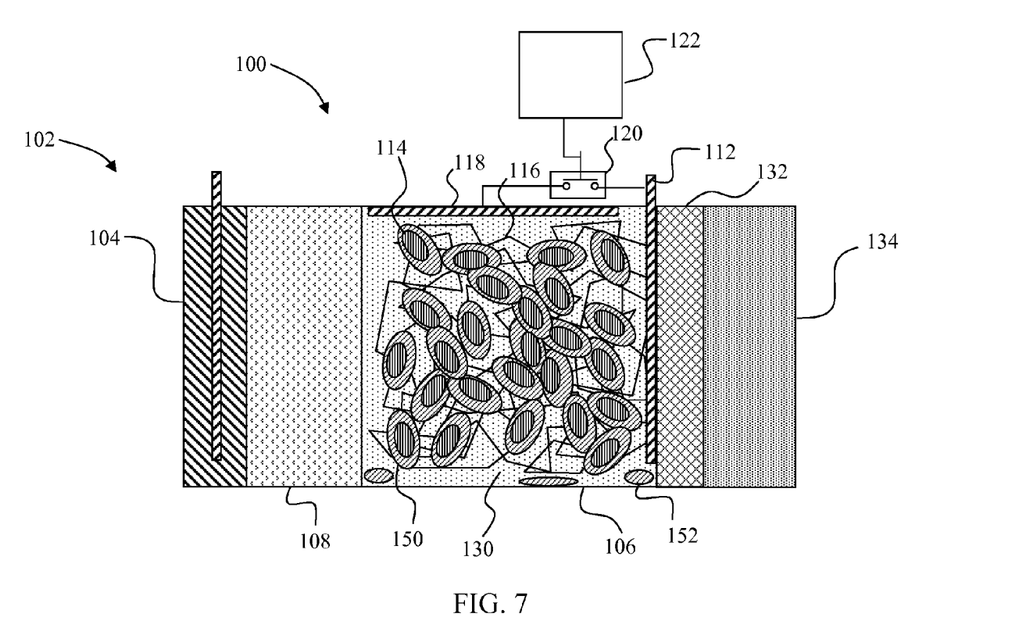
FIG. 7 depicts a schematic view of the Li/air cell of FIG. 4 with discharge products formed on the conductive matrix of the positive electrode and some disconnected discharge product located on the bottom of the positive electrode.

The positive electrode 106 in this embodiment includes a current collector 112 and carbon particles 114, optionally covered in a catalyst material, suspended in a porous matrix 116. The porous matrix 116 is an electrically conductive matrix formed from a conductive material such as conductive carbon or a nickel foam, although various alternative matrix structures and materials may be used. The pore volume of the electronically conducting porous matrix 116 forms a continuous network and is filled at least partially with an electrolyte, and potentially also partially with a gas phase. The positive electrode 106 includes a conductor 118. The conductor 118 is controllably electronically connected to the current collector 112 through a switch 120 which is controlled by a control system 122. In FIG. 7, the conductor 118 is in an electrically neutral state in that the switch 120 is depicted as being open, thereby electrically isolating the conductor 118 from the current collector 112. The potential of the conductor 118 is thus independently controllable with respect to the potential of the current collector 112.

The separator 108 prevents the negative electrode 104 from electrically connecting with the positive electrode 106.

The electrochemical cell 102 includes an electrolyte solution 130 present in the positive electrode 106 and in some embodiments in the separator 108. The electrolyte solution 130 contacts the matrix 116 and the conductor 118. In the exemplary embodiment of FIG. 6, the electrolyte solution 130 includes a salt, $LiPF_6$ (lithium hexafluorophosphate), dissolved in an organic solvent mixture. The organic solvent mixture may be any desired solvent. In certain embodiments, the solvent may be dimethyl ether (DME), acetonitrile (MeCN), ethylene carbonate, or diethyl carbonate.

A barrier 132 separates the positive electrode 106 from a reservoir 134. The reservoir 134 may be the atmosphere or any vessel suitable to hold oxygen and other gases supplied to and emitted by the positive electrode 106. While the reservoir 134 is shown as an integral member of the electrochemical cell 102 attached to the positive electrode 106, alternate embodiments could employ a hose or other conduit to place the reservoir 134 in fluid communication with positive electrode 106. Various embodiments of the reservoir 134 are envisioned, including rigid tanks, inflatable bladders, and the like. In FIG. 6, the barrier 132 is a mesh which permits oxygen and other gases to flow between the positive electrode 106 and the reservoir 134 while also preventing the electrolyte 130 from leaving the positive electrode 106.

The electrochemical cell 102 may discharge with lithium metal in the negative electrode 104 ionizing into a $Li^+$ ion with a free electron $e^-$. $Li^+$ ions travel through the separator 108 in the direction indicated by arrow 136 toward the positive electrode 106. Oxygen is supplied from the reservoir 134 through the barrier 132 as indicated by the arrow 138. Free electrons $e^-$ flow into the positive electrode 106 through the current collector 112 as indicated by arrow 140.

With reference to FIG. 7, the oxygen atoms and $Li^+$ ions within the positive electrode 106 form a discharge product 150 inside the positive electrode 106, aided by the optional catalyst material on the carbon particles 114. As seen in the following equations, during the discharge process metallic lithium is ionized, combining with oxygen and free electrons to form $Li_2O_2$ or $Li_2O$ discharge product that may coat the surfaces of the carbon particles 114.

As discharge continues, some of the discharge product 150 may flake off or in some other way become dislodged from the carbon particles 114 as depicted by the disconnected discharge product 152. Because the conductor 118 is electronically isolated from the current collector 112, however, the discharge product 150 does not form on the conductor 118.

Figure 8:
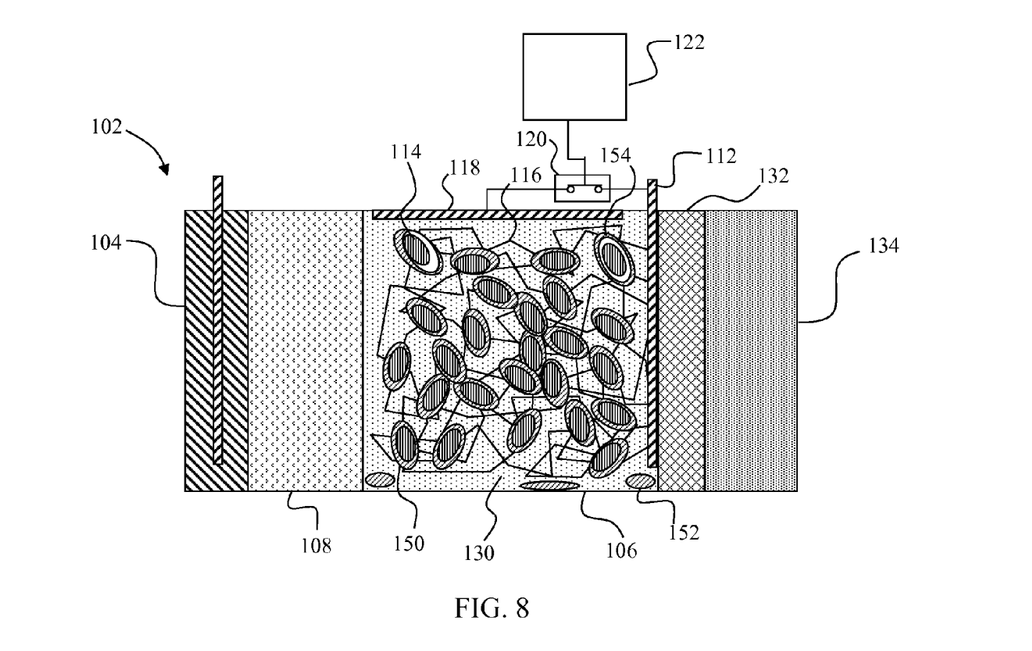
FIG. 8 depicts a schematic view of the Li/air cell of FIG. 6 with gaps formed between the discharge products formed on the conductive matrix and the conductive matrix as a result of charging or discharging the Li/air cell, and the switch in an closed position to reduce the over-potential needed to charge the cell.

When desired, the electrochemical cell 102 may be charged from the discharged state under control of the control system 122. Electrochemical cell 102 may be charged by introducing an external electric current which ideally oxidizes the $Li_2O$ and $Li_2O_2$ discharge products into lithium and oxygen. The internal current drives lithium ions toward the negative electrode 104 where the $Li^+$ ions are reduced to metallic lithium, and generates oxygen which diffuses through the barrier 132. The charging process reverses the chemical reactions of the discharge process, as shown in the The discharge products 150 in the form of $Li_2O$ and $Li_2O_2$ donate electrons according to the foregoing equations which are transported to the current collector 112 by the electrically conductive matrix 116. This reaction may occur most rapidly with the discharge products 150 immediately adjacent to the particles 114 resulting in a gap 154 as depicted in FIG. 8. In some instances, the gap 154 may electrically isolate the discharge products 150 from the electrically conductive matrix 112. In other instances, the gap 154 enables portions of the discharge product 150 to flake off, resulting in an increase in the disconnected discharge product 152.

A gap 154 may also form as a result of charging a cell. By way of example, the $Li_2O_2$ adjacent to the electronically conducting matrix may react first due to the low electronic conductivity of $Li_2O_2$, thereby liberating $O_2$, Li+, and electrons and leaving a gap between the conducting matrix and the remaining $Li_2O_2$.

Regardless of the mechanism by which a disconnected discharge product 152 or poorly connected discharge product 150 is formed, reduction of the disconnected discharge products 152 and the poorly connected discharge products 150 in the electrochemical cell 102 is enabled by the electrolyte solution 130. Specifically, the electrolyte solution 130 includes a charging redox couple which scavenges electrons from the discharge products 152 and the discharge products 150 and transports the electrons to the electrically conductive matrix 116 whereat the charging redox couple is oxidized as shown in the following equations:

$$Li_2O_2 + 2R \rightarrow O_2 + 2Li^+ + 2R^- \text{ (discharge products)}$$

$$Li_2O + 2R \rightarrow \frac{1}{2}O_2 + 2Li^+ + 2R^- \text{ (discharge products)}$$

$$2R^- \rightarrow 2R + 2e^- \text{ (conductive matrix)}$$

Once the charging redox couple has been oxidized, it is available to transport additional electrons from additional discharge products 152 and discharge products 150. Nonetheless, to provide optimal performance of the charging redox couple, the selected charging redox couple may exhibit a high solubility in the electrolyte solution 130 to ensure that a sufficient concentration of the charging redox couple is present in the electrolyte solution 130 to function as a rapid redox shuttle between the discharge product 152, the discharge products 150, and the electrically conductive matrix 116. When provided as an additive in the electrolyte solution 130, the charging redox couple is typically selected such that the charging redox couple does not react with the electrolyte, binder, separator, negative electrode, or current collectors. In one embodiment, the charging redox couple is a minor constituent of the electrolyte so that it does not adversely affect the transport properties of the electrolyte.

Performance of the electrochemical cell 102 is further optimized by proper selection of the equilibrium voltage of the charging redox couple. For example, the equilibrium voltages for $Li_2O_2$ and $Li_2O$ are, respectively, 2.96 and 2.91 V. Thus, selecting an equilibrium voltage for the charging redox couple that is slightly above 2.96 V, such as between 3 and 3.1 V, limits the over-potential during cell charge.

Exemplary classes of compounds that could be used as a charging redox couple in the electrochemical cell 102 include, but are not limited to, metallocenes (e.g., ferrocene), halogens (e.g., $I-/I3-$), and aromatic molecules (e.g., tetramethylphenylenediamine). Some specific materials within the foregoing classes which are suitable for use in a Li/air cell with an equilibrium voltage between 2.9 and 4.5 V include Ferrocene which has an equilibrium voltage between 3.05 to 3.38 V, n-Butylferrocene which has an equilibrium voltage between 3.18 to 3.5 V, N,N-Dimethyl-aminomethylferrocene which has an equilibrium voltage between 3.13 to 3.68 V, 1,1-Dimethylferrocene which has an equilibrium voltage between 3.06 to 3.34 V, 1,2,4-Triazole, sodium salt (NaTAZ) which has an equilibrium voltage of 3.1 V, and Lithium squarate which has an equilibrium voltage of about 3.1 V.

For a given embodiment, the charging redox couple may be selected to provide high reversibility approaching 100% coulombic efficiency. A highly reversible charging redox couple is desirable to allow the charging redox couple to be cycled many times during a single cell charging step. A charging redox couple that exhibits fast kinetics (i.e., its exchange current density is high) is also desirable. Fast kinetics results in a small difference between the charging redox couple's charge and discharge voltage, resulting in more efficient charging.

As described above, the charging redox couple activity is confined to the positive electrode. Therefore, in contrast to overvoltage redox couples, used to provide overvoltage protection, which require high mobility to travel between the positive electrode and the negative electrode, a high mobility is not necessary for a charging redox couple. For example, while movement on the order of 10 s of µm (high mobility) is needed in providing overvoltage protection, the charging redox couples in the electrolyte solution 130 may travel about 1 µm or less (low mobility).

If desired, a charging redox couple with high mobility may be used to function as a rapid redox shuttle between the discharge product 152, the discharge products 150, and the electrically conductive matrix 116. Because the high mobility charging redox couple, if unconstrained, may also be reduced at the negative electrode, transport of the oxidized species to the negative electrode may be blocked by applying a protective layer on the negative electrode. The charging redox couple is thus confined to the positive electrode and the separator. One material that may be used as a protective layer is $Li_{1.3}Ti_{1.7}Al_{0.3}(PO_4)_3$, a lithium-ion conducting glass-ceramic material commercially available from Ohara Corporation of Rancho Santa Margarita, Calif.

By incorporation of an optimally selected charging redox couple, the over-potential of the electrochemical cell 102 during charging is lowered. By way of example, for an exemplary electrochemical cell 102 which has discharge products 150 and disconnected discharge products 152 of $Li_2O_2$ or $Li_2O$, the equilibrium voltage of the discharge products 150 and disconnected discharge products 152 is about 2.9 to 3 V. By selecting a charging redox couple (R/R−), wherein species R− is the reduced form of species R) with an equilibrium voltage of 3.1 V, all of the charging redox couple will be in a reduced form (species R−) during discharge, when the cell voltage is below the equilibrium voltage of the discharge product.

During charge of the exemplary electrochemical cell 102, as the potential of the positive electrode with respect to Li/Li+ climbs above 3.1 V, the reduced species R− will be oxidized at the surface of the conducting matrix 116 to form species R. Species R can then react with the discharge product $Li_2O_2$ or $Li_2O$ (chemically or via a corrosion reaction) to form species R−, Li+, and $O_2$, because the discharge product 150 and disconnected discharge product 152 have an equilibrium voltage lower than that of the charging redox couple. The freshly formed species R− can subsequently yield its charge to the conducting matrix 116, while the liberated Li+ can migrate toward the negative electrode 104, where it is plated as Li metal.

Accordingly, even poorly connected discharge product 150 or disconnected discharge product 152 can be consumed electrochemically during charge at a voltage only slightly above that of the charging redox couple. Assuming a discharge voltage of 2.8 V, reducing the charge voltage from ~4 V to ~3.2 V could yield an improvement in energy efficiency from 70% to more than 87%.

In FIG. 8, the switch 120 is shown as being closed. Closing of the switch may be controlled by any desired control mechanism, but in this embodiment is controlled by the battery control system 122. By closing the switch 120, the requisite over-potential for charging of the cell 102 is lowered.

Specifically, the discharge product 150 may cover the electrically conducting portions of the positive electrode 106 of the cell 102 completely during discharge, thus interrupting the flow of electrons and inhibiting the charging process until an undesirably large potential is applied across the cell 102. By closing the switch 120 during charging, the conductor 118 is electronically connected to the current collector 112. The conductor 118 is thus placed into an electrically charged condition.

Since the conductor 118 is not covered by the discharge product 150, having been electrically isolated from the collector 112 during discharge as discussed above, the insulating property of the discharge product 150 is not encountered. The bare electronic conductor 118 is thus allowed to provide electrons for oxidation of the soluble redox additive. Preferably, the electrolyte 130 is caused to flow and is recycled between the matrix 116 and the bare conductor 118 in order to improve the rate of transport of oxidized and reduced species of the redox additive. Such a flow configuration in some embodiments includes pumps and optionally heat exchangers. In these embodiments, the object of the recirculation system is not to separate the discharge product 150 from the positive electrode compartment, but rather to decrease the charging over-potential by mitigating transport limitations related to the redox additive.

In some embodiments, the control system 122 operates the conductor 118 as a third electrode and its voltage relative to the negative electrode of the cell is controlled independently of the positive electrode, thereby enabling generation of the oxidized version of the redox additive during charge by setting the voltage difference appropriately, while controlling the voltage during discharge to ensure the discharge product 150 is preferentially deposited on the matrix 116 and/or carbon particles 114, and current collector 112. Accordingly, the control system is configured to control the potential of the conductor a non-zero value while the potential of the current collector is at a different non-zero value. The potential of the conductor 118 is thus independently controllable with respect to the potential of the current collector 112. In these embodiments, the switch 120 may be omitted.

In the above described embodiments, the charging current may be controlled by the control system 122 such that it is initially low while the matrix 116 and/or carbon particles 114 are still completely covered by the insulating discharge product 150, and then increased, gradually or stepwise, as the bare surface area of the matrix 116 and/or carbon particles 114 increases.

The control system 122 is configured to provide the functions described herein. To that end, the control system includes one or more memories in which program instructions are stored, which are operably connected to a processor for executing the program instructions. The processor in various embodiments is further operably connected to sensors including temperature sensors, current sensors, voltage sensors, etc. in order to control charging and/or discharging of the cell 102.

The above described embodiments are also useful in cells which precipitate the discharge product ($Li_2O_2$ or $LiOH-H_2O$) somewhere other than the active positive-electrode surface (i.e., where electrons are supplied to the discharge reaction), because such deposition impedes the kinetics of oxygen reduction. The terms cathode and positive electrode are used interchangeably here, although strictly speaking, they are identical only during discharge. During charge, the positive electrode becomes an anode because it involves oxidation.

In any event, because the discharge product is at least slightly soluble, then it is possible to deposit or precipitate the product somewhere other than the active positive-electrode surface. This type of preferential deposition appears to be achievable at low current densities. At higher current densities, however, the $Li_2O_2$ discharge product in particular tends to form a dense film that completely covers the surface of the electronically conducting medium of the positive electrode. High-rate discharge is desirable because it implies higher discharge power density and higher coulombic efficiency (due to less thermal decomposition of the product). However, when the positive electrode is completely covered by this insulating solid, the possibility of using a redox shuttle additive to lower the charging potential is diminished unless the conductor 109 is included.

As described above, the conductor 118 may be electronically contacted, via mechanical action, to the positive electrode during charge, and likewise disconnected during discharge. It may be operated as an independent third electrode, with control of the voltage difference between the negative electrode and third electrode, such that the redox additive is continuously oxidized during charging of the battery.

The above described embodiments facilitate oxidizing redox additives used to decrease the charging voltage of the cell. The above described embodiments thus allow for decreased charging voltage of the battery, while still allowing for high rates of discharge (i.e., high power). The above described embodiments provide increased efficiency of the battery and decreased charging time.

While the invention has been illustrated and described in detail in the drawings and foregoing description, the same should be considered as illustrative and not restrictive in character. Only the preferred embodiments have been presented and all changes, modifications and further applications that come within the spirit of the invention are desired to be protected.

The invention claimed is:

1. An electrochemical cell, comprising:
   a negative electrode including a form of lithium;
   a positive electrode spaced apart from the negative electrode and including an electron conducting matrix, a current collector, and a conductor, the conductor having a potential controllable with respect to a potential of the collector;
   a separator positioned between the negative electrode and the positive electrode;
   an electrolyte including a salt; and
   a charging redox couple located within the positive electrode, wherein the electrochemical cell is characterized by the transfer of electrons from a discharge product located in the positive electrode to the electron conducting matrix by the charging redox couple during a charge cycle.

2. The electrochemical cell of claim 1 wherein the charging redox couple is at least partially dissolved in the electrolyte.

3. The electrochemical cell of claim 2, wherein the charging redox couple has low mobility.

4. The electrochemical cell of claim 2, wherein the charging redox couple has high mobility, the electrochemical cell further comprising:
   a protective layer between the negative electrode and the positive electrode configured to block transport of an oxidized species of the charging redox couple to the negative electrode.

5. The electrochemical cell of claim 1, further comprising:
   a switch positioned between the conductor and the current collector, the switch movable between a first position whereat the conductor is in electrical communication with the current collector, and a second position whereat the conductor is electrically isolated from the current collector.

6. The electrochemical cell of claim 5, further comprising a control system, the control system comprising:
   a memory in which program instructions are stored; and
   a processor operably connected to the memory and the switch, the processor configured to execute the program instructions to control the switch to the first position during a charging event.

7. The electrochemical cell of claim 2, wherein the charging redox couple comprises one or more of a metallocene, a halogen, and an aromatic molecule.

8. The electrochemical cell of claim 2, wherein the electron conducting matrix is a porous electron conducting matrix, the electron conducting matrix including a plurality of carbon particles covered in a catalyst.

9. The electrochemical cell of claim 1, further comprising a control system, the control system comprising:
   a memory in which program instructions are stored; and
   a processor operably connected to the memory and the conductor, the processor configured to execute the program instructions to control the potential of the conductor.

10. The electrochemical cell of claim 9, wherein the processor is configured to execute the program instructions to control the potential of the conductor to a first non-zero value while the potential of the current collector is at a second non-zero value which is different from the first non-zero value.

11. An electrochemical cell, comprising:
   a negative electrode;
   a positive electrode spaced apart from the negative electrode and including a current collector and a conductor, the conductor having a potential controllable with respect to a potential of the collector;
   a separator positioned between the negative electrode and the positive electrode;
   an electrolyte including a salt; and
   a charging redox couple located within the positive electrode, wherein the electrochemical cell is characterized by the transfer of electrons from an electrically insulating discharge product located in the positive electrode to the electron conducting matrix by the charging redox couple during a charge cycle.

12. The electrochemical cell of claim 11 wherein the charging redox couple is at least partially dissolved in the electrolyte.

13. The electrochemical cell of claim 12, wherein the charging redox couple has low mobility.

14. The electrochemical cell of claim 12, wherein the charging redox couple has high mobility, the electrochemical cell further comprising:
   a protective layer between the negative electrode and the positive electrode configured to block transport of an oxidized species of the charging redox couple to the negative electrode.

15. The electrochemical cell of claim 11, further comprising:
   a switch positioned between the conductor and the current collector, the switch movable between a first position whereat the conductor is in electrical communication with the current collector, and a second position whereat the conductor is electrically isolated from the current collector.

16. The electrochemical cell of claim 15, further comprising a control system, the control system comprising:
   a memory in which program instructions are stored; and
   a processor operably connected to the memory and the switch, the processor configured to execute the program instructions to control the switch to the first position during a charging event.

17. The electrochemical cell of claim 12, wherein the charging redox couple comprises one or more of a metallocene, a halogen, and an aromatic molecule.

18. The electrochemical cell of claim 12, the positive electrode further comprising:
   a porous electron conducting matrix, the electron conducting matrix including a plurality of carbon particles covered in a catalyst.

19. The electrochemical cell of claim 11, further comprising a control system, the control system comprising:
   a memory in which program instructions are stored; and
   a processor operably connected to the memory and the conductor, the processor configured to execute the program instructions to control the potential of the conductor.

20. The electrochemical cell of claim 19, wherein the processor is configured to execute the program instructions to control the potential of the conductor to a first non-zero value while the potential of the current collector is at a second non-zero value which is different from the first non-zero value.

* * * * *